United States Patent [19]

Santiago-Aviles et al.

[11] Patent Number: 5,217,754
[45] Date of Patent: Jun. 8, 1993

[54] ORGANOMETALLIC PRECURSORS IN CONJUNCTION WITH RAPID THERMAL ANNEALING FOR SYNTHESIS OF THIN FILM CERAMICS

[75] Inventors: Jorge J. Santiago-Aviles; Donald H. Berry, both of Philadelphia, Pa.

[73] Assignee: Trustees of the University of Pennsylvania, Philadelphia, Pa.

[21] Appl. No.: 601,043

[22] Filed: Oct. 23, 1990

Related U.S. Application Data

[63] Continuation of Ser. No. 220,569, Jul. 18, 1988, abandoned, which is a continuation-in-part of Ser. No. 78,368, Jul. 27, 1987, abandoned.

[51] Int. Cl.$^5$ .................. B05D 3/02; C04B 35/64
[52] U.S. Cl. .................. 427/226; 264/61; 501/12
[58] Field of Search .................. 264/61; 501/12; 427/53.1, 54.1, 226

[56] References Cited

U.S. PATENT DOCUMENTS

| | | | |
|---|---|---|---|
| 2,956,327 | 10/1960 | Borel et al. | 25/157 |
| 3,049,431 | 8/1962 | Russell | 106/39 |
| 3,496,008 | 2/1970 | Haskins et al. | 117/215 |
| 4,019,915 | 4/1977 | Miyauchi et al. | 106/73.31 |
| 4,584,280 | 4/1986 | Nanao et al. | 501/12 |
| 4,626,394 | 12/1986 | Wada et al. | 264/65 |

FOREIGN PATENT DOCUMENTS

| | | |
|---|---|---|
| 52-35198 | 4/1978 | Japan . |
| 59-209212 | 11/1984 | Japan . |
| 60-172103 | 9/1985 | Japan . |
| 60-236404 | 11/1985 | Japan . |

OTHER PUBLICATIONS

RTP: On The Edge of Acceptance; 66/Semiconductor International, Mar. 1987; pp. 66-70.
Pulse, vol. 3 (1), AG Associates (Jan. 1985).
Refractory Metal Silicide Formation by Ion Beam Mixing and Rapid Thermal Annealing; Kwong, Meyers, Alvi, Li, and Norbeck; Appl. Physc. Lett. 47(7); 1985 Amer. Inst. of Physics; pp. 688-691.
Annealing; May 1985 Semiconductor International; pp. 79-84.
Transient Annealing as a Tool for the Investigation of Thin-Film-Substrate Solid-Phase Reactions; Bentini, Nipoti, Berti, Drigo, and Cohen; J. Appl. Phys. 58(3), Aug. 1, 1985; 1985 American Institute of Physics; pp. 1234-1239.
Activation and Redistribution of Implants in Polysi by RTP; Chow and Powell; Semiconductor International, May 1985; pp. 108-113.
Formation and Titanium Silicide by Rapid Thermal Annealing; Pramanik, Deal, Saxena, and Wu; May 1985 Semiconductor International; pp. 94-100.
Shaikh and Vest, "Kinetics of $BaTiO_3$ and $PbTiO_3$ Formation from Metallo-organic Precursors," 69(9) *J. Am. Ceram. Soc.* 682 (1986).
Kirk-Othmer, *Concise Encyclopedia of Chemical Technology*, pp. 463-465 (1985).
Hamdi, et al., "Formation of Thin-Film High $T_c$ Superconductors by Metalorganic Deposition," 51(25) *Appl. Phys. Lett.* 2152 (Dec. 21, 1987).
Mantese, et al., "Rapid Thermal Annealing of High $T_c$ Superconducting Thin Films Formed by Metalorganic Deposition," 52(19) *Appl. Phys. Lett.* 1631 (May 9, 1988).
Hamdi, et al., "Grain Growth of Rapid-Thermal-Annealed Y-Ba-Cu Oxide Superconducting Thin Films," 53(5) *Appl. Phys. Lett.* 435 (Aug. 1, 1988).

*Primary Examiner*—James Derrington
*Attorney, Agent, or Firm*—Woodcock Washburn Kurtz Mackiewicz & Norris

[57] ABSTRACT

An organometallic precursor mixture is formed containing desired components of a final ceramic. This precursor mixture is dissolved in an organic solvent. The dissolved mixture is then spin cast or otherwise evenly deposited onto a wafer substrate. Finally, the coated wafer substrate is annealed by a process of Rapid Thermal Annealing to produce a thin ceramic film and to remove any organic material. This process exhibits preferential crystal growth to produce a uniform thin film.

12 Claims, No Drawings

ORGANOMETALLIC PRECURSORS IN CONJUNCTION WITH RAPID THERMAL ANNEALING FOR SYNTHESIS OF THIN FILM CERAMICS

This invention was made with government support under a grant awarded by the National Science Foundation. The U.S. Government has certain rights in this invention.

This is a continuation of application Ser. No. 07/220,569, filed Jul. 18, 1988, now abandoned which, in turn, was a continuation-in-part application of Ser. No. 07/078,368, filed Jul. 27, 1987, now abandoned.

BACKGROUND OF THE INVENTION

1. Field of the Invention

The field of the present invention is thin film ceramics. The present invention relates to the use of organometallic precursors and rapid thermal annealing for the synthesis of thin film ceramics.

2. Description of the Prior Art

Ceramic materials, and in particular ferroelectric ceramics have previously been prepared in a variety of ways that generally involve forming the ceramic ferroelectric body by pressing, casting, extrusion, or by means of thin sheet techniques, all followed thereafter by a burning or firing operation at elevated temperatures. The ceramic ferroelectric bodies are useful as capacitors, piezo-electric elements, transducers, and for various applications in the electrical field.

The majority of the prior art techniques result in a powder that is thereafter pressed or bonded into a usable form such as a pellet. Examples of such prior art include U.S. Pat. No. 4,019,915 (Miyauchi et al.), which discloses hot pressing and sintering under a high pressure, and U.S. Pat. No. 2,956,327 (Borel et al.), which discloses utilization of temperatures exceeding 900° C. for extended periods of time combined with substantially elevated pressures resulting in a powder, paste, disc, or other shape of body. Other examples of prior art materials and methods are disclosed in U.S. Pat. No. 4,626,394 (Wada et al.), and U.S. Pat. No. 3,049,431 (Russell).

A particular class of useful ferroelectric ceramic materials are the perovskites, whose particular crystal structure allow them to be permanently electrically polarized. Such perovskites, which are the high temperature form for many mixed non-volatile memories, sensors, actuators, or non-linear optics due to their ability to produce a voltage when deformed. (For a general overview of ferroelectrics and perovskites, see Kirk-Othmer, *Concise Encyclopedia of Chemical Technology*, pp. 463-465 (1985).) At the present time, however, the usefulness of the perovskite materials has been limited by the inability to efficiently form thin film forms that can be used in today's microelectric devices. Therefore, the primary mechanism used today for non-volatile memories is the permanent magnetic bubble domain. This mechanism requires circuitry to drive it, thereby limiting its miniaturization capability and requires comparatively larger amounts of power for processing and use.

The prior art methods of producing ceramic materials, such as the ones previously discussed, are limited in their inability to form uniform, thin films. Most such prior art methods either involve high pressure and high temperature, both tending to add substantial cost to the processing of the ceramic, or they result in films that are overly thick or have excessive non-uniformity exhibited as pin holes. There is a need for thin film ferroelectrics, but ferroelectrics tend to lose their ferroelectric properties if they are originally made from bulk sources and only later attempted to be formed or used in thin sections or coatings.

In addition to the problems just discussed, in order to use such ceramic materials for silicon chips or other electronic components of this nature, a comparatively low processing temperature is required to avoid the melting or diffusion of the electronic circuitry and of the layered materials contained in the substrates. Furthermore, the thin film used in application to silicon chips must have good adhesion so that it will stick to the substrate without peeling or cracking. Adhesion can be the key in microelectronics where any possible locational variations can affect operation.

A still further problem in the manufacture of perovskite and other ferroelectric ceramics is meeting the product requirement of a substantially pure final material while still producing the requisite form or structure. Current methods of heating during the manufacturing of such ceramics typically heat the reacting materials at too slow a rate. This can result in the promotion of slow-forming products that are undesirable in addition to causing excessive diffusion within the substrate material.

Conversely, although there are a variety of current methods for making thin films such as sputtering, flow reacting, thermal evaporation, and chemical vapor deposition, their usefulness in manufacturing oxides or mixed oxide ceramics is limited due to the difficulty of dealing with the materials.

Accordingly, there exists a need for a rapid, efficient method of producing uniform thin films of ferroelectric or perovskite-type ceramics as well as other oxides.

SUMMARY OF THE INVENTION

The present invention is directed to obtaining high purity, uniform thin film ceramics, processed at moderate temperatures and low pressures from organometallic precursors. Among the thin film ceramics of interest are ferroelectric and ionic conductive ceramics such as the perovskite ferroelectric family (e.g., $BaTiO_3$). Thin film oxide ceramics can also be readily made using the process of the present invention. Precursors containing the proper starting materials to produce the desired ceramic are deposited from solution by spin casting or other similar methods onto a substrate. Thereafter, the deposited precursors are treated by Rapid Thermal Annealing to eliminate organic components and anneal the ceramic upon the substrate. The produced thin film ceramic has superior uniformity and can thereafter be used, for example, in microelectronics by patterning the ceramic using photo-lithography.

The method of the present invention produces a thin film ceramic of superior quality more economically and rapidly than prior art methods.

Accordingly, it is an object of this invention to provide organometallic precursors deposited onto substrates in a thin film fashion to be used with rapid thermal processing for the synthesis of thin film ceramics. Other and further objects and advantages will appear hereinafter.

DETAILED DESCRIPTION OF THE PREFERRED EMBODIMENT

While the present invention can be used in the formation of a wide variety of thin film ceramics, a primary aspect of the present invention is the formation of perovskite-type ferroelectrics such as $BaTiO_3$ and $PbTiO_3$ from organometallic precursors using Rapid Thermal Annealing (RTA) (sometimes referred to as Rapid Thermal Processing (RTP)) for a combination of thermolysis and/or photolysis of the precursors.

The possibilities of efficiently growing uniform thin film ferroelectric ceramics will undoubtedly enhance the possibility of fabricating high density, non-volatile memory devices and large area, flat, planar displays, among other applications. The model system barium titanate was initially selected for this work because of its relative importance as a ferroelectric material. The process, however, can be readily applied to the formation of a wide variety of ceramics. The crystalline form of $BaTiO_3$ has been obtained by different techniques but there has been difficulty in forming the material in uniform films less than 1 micron thick. The process of the present invention involves three primary steps. First is the synthesis of an appropriate organometallic precursor mixture. Such a precursor mixture can then be dissolved prior to application to a substrate. The advantage to dissolving the organometallic precursors is that it allows them to mix at a molecular level, which eliminates the need for extremely high temperatures to produce the final ceramic oxide. Evaporation of the organic solvent produces a homogeneous precursor film. Initial thermal decomposition of this film leads to extremely fine metal oxide particles, that subsequently combine to form the final ceramic. The small size (10–50nm) of these particles, which allows the relatively low temperatures and short processing times of the process of the present invention, cannot be achieved by traditional ceramic technologies.

The synthesis of several organometallic precursors is known. A typical example of such synthesis is disclosed in Shaikh and Vest, "Kinetics of $BaTiO_3$ and $PbTiO_3$ Formation from Metallo-Organic Precursors," 69[9] *J. Am. Ceram. Soc.*, 682 (1986), incorporated herein by reference. Similar procedures could be followed using other elements to produce analogous results. Shaikh and Vest utilize the prior art method of filling a crucible with the reacting materials and then baking, which results in a final powder rather than a thin film. Shaikh and Vest, however, do not employ Rapid Thermal Annealing, the third step of the process of the present invention, nor do they deal to any extent with the use of thin films. Failing to recognize the criticality of the Rapid Thermal Annealing step, or its equivalent, ceramics synthesized by their methods will have the adherence and uniformity problems discussed in the background section of this application. Such processes are also slower, and therefore less efficient.

Using a preferred embodiment that results in the formation of a $BaTiO_3$ ceramic, in the chemical reaction of titanium methoxide and neodecanoic acid, one of the precursors, titanium dimethoxy dineodecanoate [$(CH_3O)_2 Ti (C_9 H_{19} COO)_2$], is formed. The other precursor, barium dineodecanoate [$Ba (C_9 H_{19} COO)_2$], is prepared by treating $BaCl_2$ with neodecanoic acid. (A lead analog can also be prepared using lead dineodecanoate.) A near stoichiometric mixture of these two precursors is then dissolved with xylene or some other suitable solvent.

It is important that the precursor be soluble in organic solvents in order to accomplish the subsequent coating step. It will be apparent to those of ordinary skill in the art that a wide variety of organometallic precursors and organic solvents can be chosen and used depending upon the composition of the final ceramic desired. The ceramic composition desired will determine the choice of materials and ratios of the components used in the precursor, but should not otherwise effect the subsequent procedure. In general, the organometallic precursor mixture will consist of some combination of metal alkoxides or metal carboxylates.

In the second step of the process, the precursor solution is then applied to a substrate. The substrate will typically be of the silicon wafer variety used in microelectronics. The form of the substrate, however, is not critical to the process of the present invention. Spin casting is the preferred method of application because it results in good uniform thickness of the precursor film and, therefore, the final ceramic. While the preferred method employs spin casting, other techniques may be used that would accomplish the even spreading of the precursor materials onto the particular substrate.

Use of spin casting involves squirting a small amount of the dissolved organometallic precursor mixture onto a rapidly spinning substrate. The spinning step serves both to evenly distribute the precursor material and to evaporate most of the organic solvent. One of the prime advantages of using this technique is the simplicity of the equipment required, and the resultant economic efficiency. Spin casting is much cheaper and faster than other methods of making thin films such as sputtering, flow reactors, thermal evaporation, or chemical vapor disposition.

The substrate and deposited precursor film are then processed in a Rapid Thermal Annealing system as the third primary step of the process. The Rapid Thermal Annealing process decomposes the precursors, eliminating the organic components and forms the desired ceramic film. This system preferably consists of a gang of six quartz-halogen-tungsten lamps capable of producing power densities of 30 $W/cm^3$ at the surface of samples enclosed in a vacuum or a controlled atmosphere reactor.

Rapid Thermal Annealing accomplishes the formation of the desired thin film ceramics within a few seconds, typically 20–25 seconds. The process of the present invention places the barium at a high temperature to enhance the formation of $BaTiO_3$. This is only done, however, for a short period, thereby avoiding diffusion processes taking place in the chip, which consists of previously fabricated layers and structures. Because of the rapid, directional heating involved, the temperature of the reactants is quickly raised to the critical temperature while the substrate materials beneath the deposited reactants remain substantially cooler. Thus, excessive diffusion, which is favored by both high heat and extended time periods, is avoided. The temperature of the film will generally not exceed 750° C. It is possible to achieve adequate reactions at these temperatures because of the molecular level mixing accomplished by the use of the organometallic precursors in solution.

The speed of the annealing is also important in that it avoids the adhesion problems of peeling and cracking that typically occur with other methods that must heat for longer periods of time. Such peeling and cracking is believed to occur because of the different coefficients of expansion between the substrate and the film. Rapid Thermal Annealing is a batch process and, therefore, the entire surface is heated evenly. This sets up a large axial thermal gradient but very little horizontal gradient. The directional heat flow of the annealing process can also lead to preferential crystal growth within the ceramic by comparison to other prior art methods. For example, furnaces create much greater horizontal temperature gradients than does Rapid Thermal Annealing.

While the preferred embodiment of the process of the present invention utilizes Rapid Thermal Annealing involving the use of high intensity lamps, other methods for rapidly heating the film can also be used. For example, $CO_2$ lasers could be used, and would probably be faster. The same is also true of the use of UV lasers. Both of these methods, however, would involve significantly more expense.

The rapid thermal annealing step has the further advantage of being performed at low pressures. In a preferred embodiment, the annealing is accomplished under a vacuum, but it could also be performed at atmospheric pressure. This is in contrast to many of the processes of the prior art that require the use of high pressure during the sintering of the ceramic powder.

In the example of the preferred embodiment, samples were processed for varying times ranging from 5 to 50 sec. and measured at temperatures from 475° C. to 900° C. both in vacuum ($10^{-7}$ Torr) and in air. Then, the samples were characterized on an x-ray diffractometer to identify the phases present. The x-ray diffraction results showed a mixed phase sample of $BaTiO_3$ and $BaCO_3$. The amount of $BaCO_3$ was found to decrease as a function of processing temperature up to approximately 700°-750° C., at which temperature it is no longer detectable. Stoichiometry, lateral surface composition, and depth profile of the materials were also analyzed using Scanning Auger spectrometry. Surface morphology and grain structure were analyzed using a scanning electron microscope (SEM). All of these analyses confirmed the purity and uniformity of the thin film ceramic. Use of the process of the present invention resulted in a substantially pure perovskite thin film ceramic.

The process of the present invention results in thin films on the order of about 0.1-1.0 micrometers. The thickness of the film can be varied to some extent in the spin casting step. Other techniques of deposition can allow different thicknesses. The films produced are highly uniform with virtually no holes or other inconsistencies. Using the method of the present invention, thin films can be deposited upon substrates in areas large enough that they can thereafter be patterned using standard photo-lithography techniques. With the appropriate technology, the thin film could be initially formed in an image. Thus, the thin film ceramics produced by the process of the present invention will be highly useful in the microelectronics industry particularly in such areas as non-volatile memories. The ability to use thin film perovskites in microelectronics avoids the limits on miniaturization imposed by the use of current non-volatile memories such as magnetic bubble domains while, at the same time, decreasing the power required to run such microelectronic devices Thin film perovskites will be readily useful for high resolution transducers and for flat display elements where bulk perovskites produced by prior art methods can not be readily or efficiently used.

Thin film ceramics produced by the process of the present invention also have the advantage of improved adhesion to the substrate when compared to prior art ceramics. There is little or no peeling or cracking during the production process. Further, since neither high pressures nor extended high temperatures are required, the process of the present invention is also economically efficient when compared to prior art methods. Still further, the speed of processing allows a substantially greater manufacturing throughput.

The process of the present invention has wide application. For example, one of the most rapidly developing fields of technology today is that of super-conductors. The process of the present invention can be advantageously applied to this field as well. The organometallic precursor mixture could contain copper neodecanoate, barium neodecanoate, and yttrium neodecanoate in appropriate ratios and end up producing a thin film ceramic of the perovskite super-conductor $YBa_2Cu_3O_{7-x}$.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A method for manufacturing a film ceramic comprising:
   providing an organometallic precursor;
   dissolving said precursor in an organic solvent;
   depositing the dissolved organometalic precursor onto a substrate; and
   heating the deposited, dissolved precursor on the substrate for a period of time less than about 50 seconds and under conditions of temperature effective to decompose the precursor, eliminate organic components and form the ceramic film on said substrate.

2. The method of claim 1 wherein the dissolved, deposited organometallic precursor is heated at a temperature between 475°-900° C.

3. The method of claim 1 wherein the deposited organometallic precursor does not exceed a temperature of about 750° C.

4. The method of claim 1 wherein the film ceramic is a ferroelectric ceramic.

5. The method of claim 4 wherein the ferroelectric ceramic is a perovskite.

6. The method of claim 1 wherein the film ceramic is an oxide ceramic.

7. The method of claim 1 wherein the organometallic precursor is a mixture of one or more metal alkoxide or metal carboxylate.

8. The method of claim 1 wherein the organometallic precursor is a mixture of barium dineodecanoate or lead dineodecanoate with titanium demethoxy dineodecanoate.

9. The method of claim 1 wherein the method of depositing said dissolved organometallic precursor onto said substrate is spin casting.

10. The method of claim 1 wherein the method is performed at a pressure not exceeding one atmosphere.

11. The method of claim 1 wherein the film ceramic is less than about 1 micron thick.

12. An improved method of manufacturing an electric, electronic, or mechano-electric device having electrically conductive elements comprising:

manufacturing one or more of said electrically conductive elements by the process of dissolving an organometallic precursor in an organic solvent;

depositing said dissolved organometallic precursor onto a substrate to be used in said electrically conductive element; and heating the deposited, dissolved precursor on the substrate for a period of time less than about 50 seconds and under conditions of temperature effective to decompose the precursor, eliminate organic components and form a ceramic film on said substrate.

* * * * *